No. 837,528. PATENTED DEC. 4, 1906.
T. P. & W. W. WILSON.
STEERING DEVICE.
APPLICATION FILED JAN. 4, 1906.
2 SHEETS—SHEET 2.
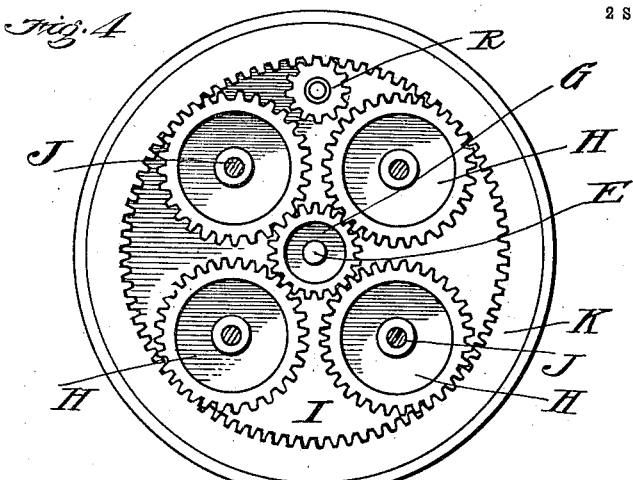
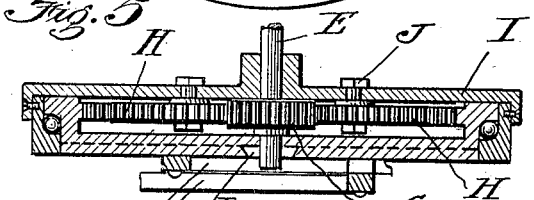
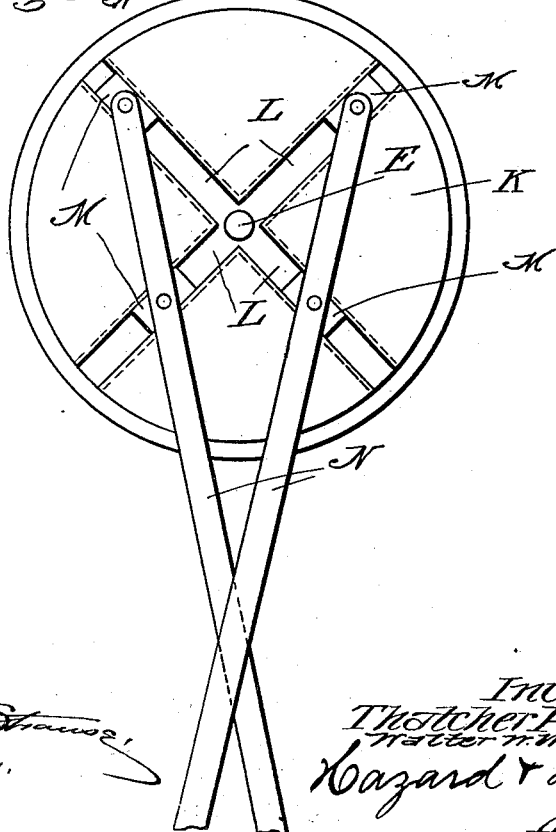
Witnesses
Edmund A. Strause
M. A. Jones
Inventors
Thatcher P. Wilson
Walter W. Wilson
Hazard & Harpham
Attorneys.

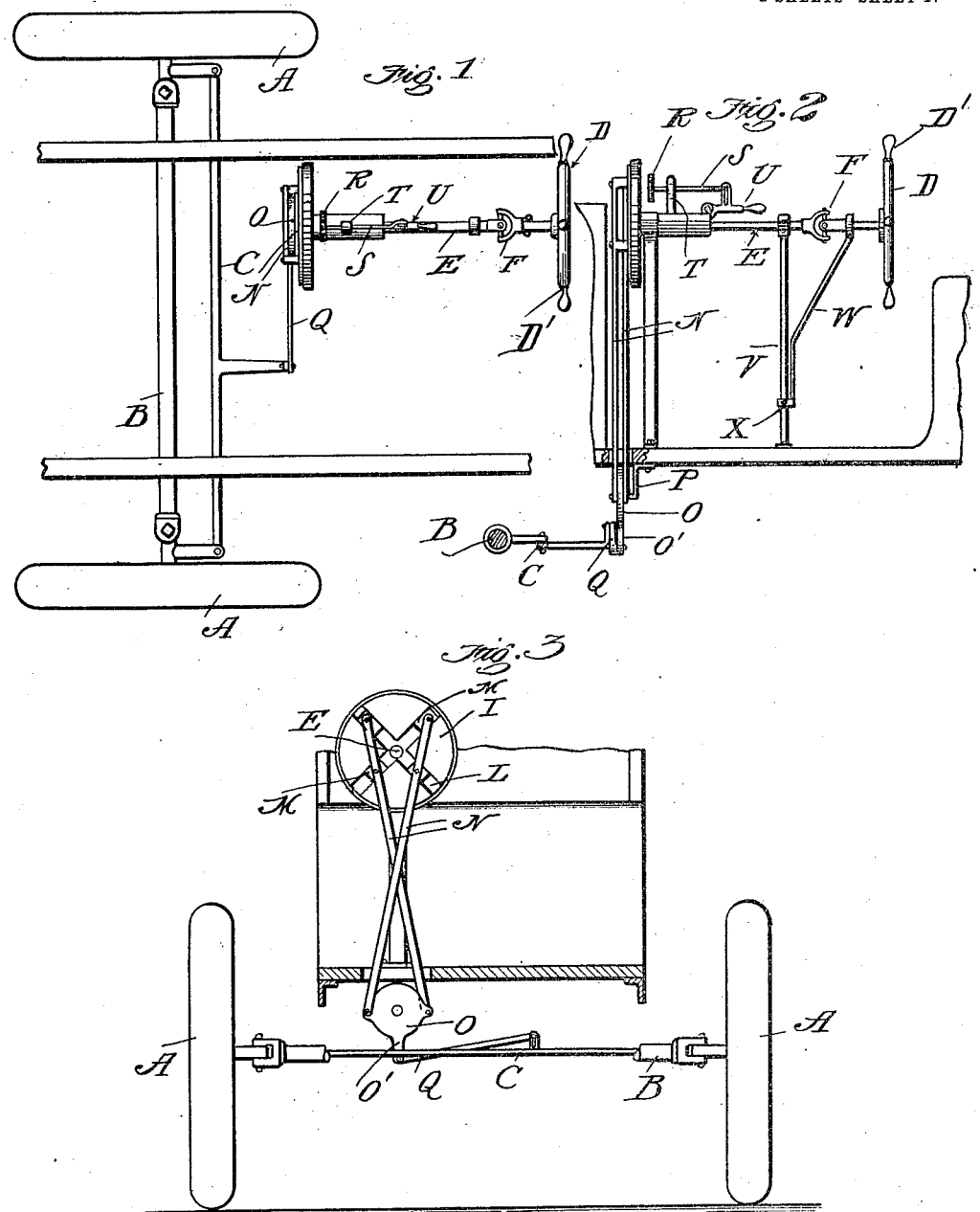

UNITED STATES PATENT OFFICE.

THATCHER P. WILSON AND WALTER W. WILSON, OF LONGBEACH, CALIFORNIA.

STEERING DEVICE.

No. 837,528.  Specification of Letters Patent.  Patented Dec. 4, 1906.

Application filed January 4, 1906. Serial No. 294,656.

*To all whom it may concern:*

Be it known that we, THATCHER P. WILSON and WALTER W. WILSON, citizens of the United States, residing at Longbeach, in the county of Los Angeles and State of California, have invented new and useful Improvements in Steering Devices, of which the following is a specification.

Our invention is adapted for use in steering boats, automobiles, and the like or in any situation in which a steering-wheel or tiller is used, and it is particularly adapted for use in automobiles or boats, for reasons which will be hereinafter stated.

The object of our invention is to provide a rigid steering device easily manipulated by hand and in which the direction will not be changed in the vehicle or boat on which our steering device is used by contact with an obstruction in the road or by any unusual or sudden strain placed thereon. We accomplish this object by means of the device described herein and shown in the accompanying drawings, in which—

Figure 1 is a fragmentary view of the front part of the running-gear of an automobile equipped with our steering device. Fig. 2 is a fragmentary view, partly in section and partly in elevation, of our steering device. Fig. 3 is a fragmentary front view, partly in section and partly broken away, of an automobile equipped with our steering device. Fig. 4 is an elevation of the planetary gear and connecting parts. Fig. 5 is a central vertical section taken through the planetary gear and the casing surrounding the same, the gear being shown in elevation. Fig. 6 is a front elevation of the operating-slides slidingly mounted on the front of the plate or casing which carries the planetary gear.

In the drawings, A represents the front wheels of an automobile, B the front axle thereof, and C the conventional steering-bar used on automobiles. The steering-wheel D is vertically mounted in front of the seat on the horizontal steering-shaft E and moves in a vertical plane. It carries on its periphery thereof a plurality of handles D′, the purpose of which is to afford additional means to steady the wheel while operating the car. The steering-shaft E carries a universal joint F. The steering-wheel is mounted on the rear end of the shaft, and on its forward end a spur-gear G is keyed. The upright standard V, which supports the shaft E, has adjustably mounted thereon the supporting-arm W, which supports the steering-wheel at any angle desired. The adjustment of the arm on the upright standard is accomplished by means of the adjusting-screw X. The spur-gear meshes with the four our-gears H, pivotally mounted on the gear-carrying plate I by means of the bolts J, passing through the plate and projecting inwardly, carrying these gears on their inner ends. This plate forms a bearing for the forward end of the steering-shaft through which the steering-shaft projects. The rotation of the steering-shaft will cause the rotation of the spur-gears H, and these gears in turn will cause the rotation of the plate K. This plate has on its outer rim internally-projecting teeth which mesh with the gears H. This plate K carries on the reverse side thereof dovetailed grooves L, adapted to receive and hold in sliding engagement therewith the slides M, four in number, as shown in Fig. 6. These slides are pivotally attached to the upper ends of the steering-levers N. The lower end of these steering-levers cross each other, as shown in Fig. 3. The lower ends thereof are pivotally secured to opposite sides of the oscillating disk O. This disk is centrally journaled in a projection P on the frame. On a projection O′ on the disk a connecting-bar Q is pivoted, the other end of which is pivotally secured to the steering-bar C. By this arrangement it will be manifest that upon the rotation of the steering-wheel the steering-bar through intermediate parts will be moved to the right or left and change the direction in which the car is moving. When either wheel of the car contacts with an unusual obstruction in the road, the slides M will be held in rigid engagement in the slots L and rigidly hold the wheel against the obstruction and prevent the wheel from being turned thereby. A car equipped with our steering device will be easily managed and at the same time be prevented from turning to the right or left when running over obstructions in the road. It will also prevent the sudden jar usual in steering-wheels of the conventional type when obstructions present themselves in the road, which frequently throws the steering-wheel out of the driver's hand, causing him to lose control of the car.

In Figs. 1 and 2 we have shown means whereby the steering device of an automobile can be locked by moving forwardly the supplementary spur-gear R into engagement with the spur-gears H and the internally-projecting teeth on a gear-carrying plate K, as shown in Fig. 4. This supplementary gear is keyed to a horizontally-mounted shaft S, which has a longitudinal movement through the upwardly-projecting lug T on the frame. By elevating the free end of the lever U the supplementary gear will be moved forwardly into engagement with the internally-projecting teeth on the plate K and prevent the rotation of the plate, and consequently prevent the movement of the steering-bar, and thereby disable the operator from steering the car. In Figs. 1 and 2 the lever U is shown in its normal or unlocked position. A lock (not shown) can be provided to hold the supplementary gear in its forward or locked position and prevent the use of the car by any one not having the key to unlock the same.

Having described our invention, what we claim as new, and desire to secure by Letters Patent, is—

1. The herein-described steering device comprising a horizontally-mounted steering-shaft having keyed on the front end thereof a spur-gear; planetary gears surrounding said spur-gear and adapted to mesh therewith; a slide-carrying plate having on the rim thereof inwardly-projecting gear-teeth adapted to mesh with the planetary gears, the said plate being provided on its front side with radial dovetail grooves for the reception and operation of steering-slides, slides in said grooves having pivotally attached thereto at their top ends vertically-mounted steering-levers, the lower ends of said steering-levers being operatively connected with the steering-bar of the automobile.

2. A steering device for automobiles comprising a steering-shaft E having thereon a universal coupling F and a steering-wheel D, the said shaft being mounted horizontally and carrying on its forward end a spur-gear G; a gear-carrying plate I having rotatively mounted thereon four spur-gears H adapted to mesh with the spur-gear G on the steering-shaft; a slotted plate K having radial dovetailed grooves L therein adapted to slidingly engage slides M therein, slides M in said grooves, steering-levers N vertically mounted and pivotally connected at their upper end with said slides; steering-levers N adapted to cross each other in the center and pivotally connected at their lower ends with the guiding-disk O; a connecting-link Q pivotally connected at the end with the guiding-disk and at the other end with the steering-bar C, and the steering-bar C substantially as herein shown and described.

3. Means to lock the steering-gear of an automobile having the parts herein described, comprising a spur-gear R mounted on a horizontally-mounted shaft S and adapted to be moved backward or forward by the lever U substantially as herein shown and described.

4. In an automobile of the character herein described, a planetary gear carried on a gear-carrying plate adapted to mesh with a spur-gear on the steering-shaft in combination with a plate having on one side thereof dovetailed grooves extending at right angles across the face of the plate and having on the other side of said plate internally-projecting gear-teeth adapted to engage the planetary gear, slides in said grooves carrying steering-bars operatively connected therewith and with the steering-bar of the automobile.

5. In an automobile provided with a steering device having a planetary gear adapted to mesh with a spur-gear keyed to the end of the steering-shaft, a spur-gear adapted to be thrown into or out of engagement with the planetary gear and the gear on the steering-shaft, and thereby lock or unlock the steering device of the automobile.

In witness that we claim the foregoing we have hereunto subscribed our names this 29th day of December, 1905.

THATCHER P. WILSON.
WALTER W. WILSON.

Witnesses:
G. E. HARPHAM,
HENRY T. HAZARD.